United States Patent Office.

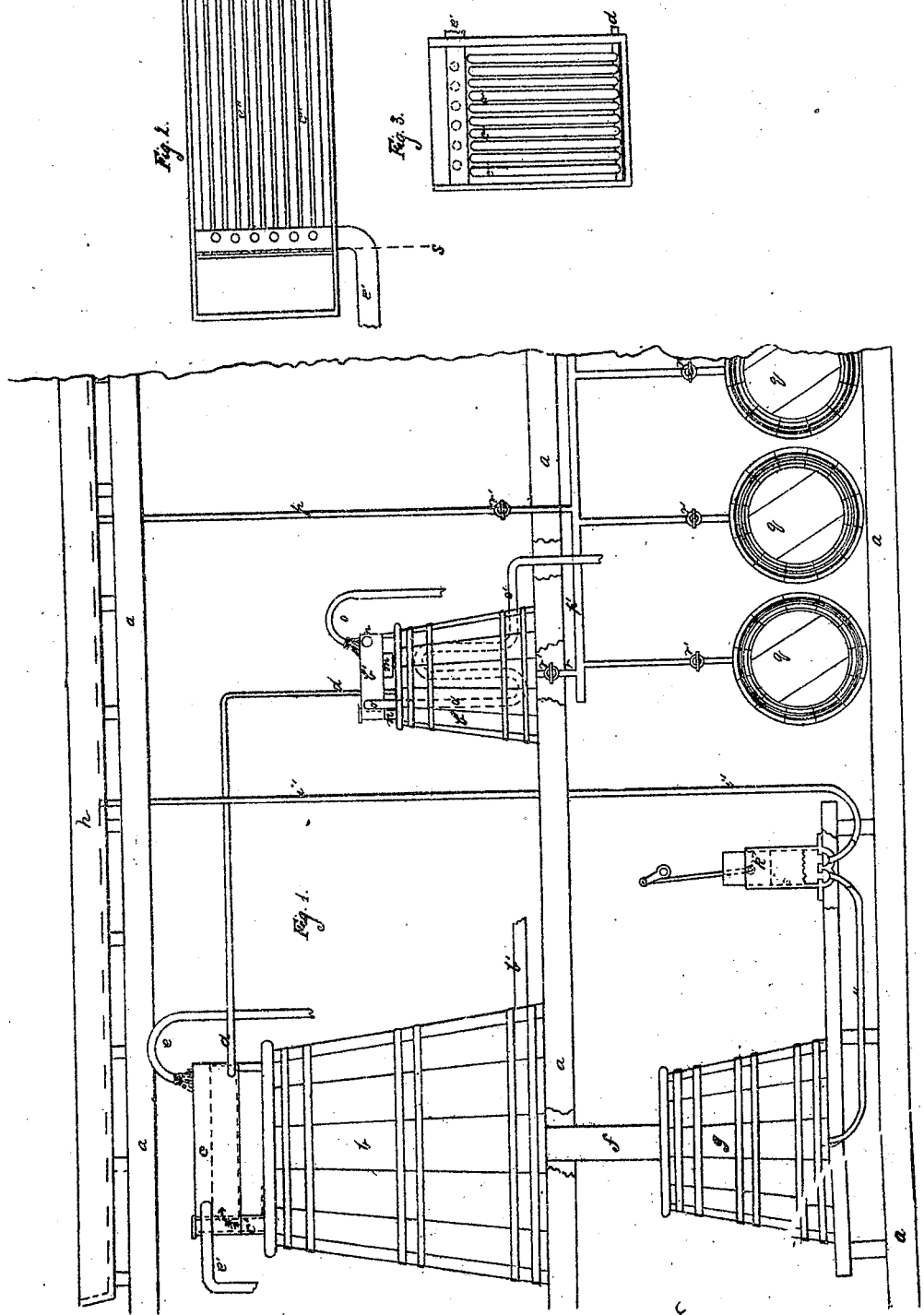

WILLIAM H. ELLIOT, OF NEW YORK, N. Y.

Letters Patent No. 72,989, dated January 7, 1868.

---

IMPROVEMENT IN BREWING.

---

*The Schedule referred to in these Letters Patent and making part of the same.*

---

TO ALL WHOM IT MAY CONCERN:

Be it known that I, WILLIAM H. ELLIOT, of the city, county, and State of New York, have invented a new and improved Process of Brewing Beer and other Malt Liquors; and I do hereby declare that the following is a full and exact description thereof, reference being had to the accompanying drawings, and to the letters of reference marked thereon.

Similar letters of reference indicate the same devices in all the figures.

To enable others skilled in the arts to comprehend, make, and use my invention, I will proceed to describe its nature, construction, and operation.

The nature of my invention consists in condensing the vapor which passes off from boiling wort, and in returning the same to the wort again before it is fermented; in cooling the wort and condensed or liquefied vapor separately, and in keeping the latter in a condition in which evaporation cannot go on, until such time as it becomes necessary to mix the two liquids together; in employing a tank for reserving the liquefied vapors with its cooling-apparatus, in combination with a boiling-tank and its usual heating-apparatus; in the employment, between these two tanks, of a surface-condenser; in the employment of two condensers, in combination, one to reduce the steam or vapors of the boiling wort to a liquid, the other to condense any evaporation that may arise from the liquefied vapor after it has reached its reservoir; in employing the same stream of water to condense vapor from the reservoir and to cool the contents of the same.

Figure 1 is an elevation of a portion of a distillery.

Figure 2 is a top view of a condenser.

Figure 3 is a section of the same at dotted line S.

$a$, beams or framework of the distillery; $b$, tank, and $b'$, steam-heating pipe for boiling wort; $c$, condenser; $c'$, conducting-pipe for steam from the tank to the condenser; $c''$ their passages in the condenser, which are surrounded by water, and serve as condensing-surfaces. These open into conducting-pipe $c'$ at one end, and into pipe $d$ at the other end. $e$, water-pipe, which brings cold water to the condenser. $e'$, waste-pipe which carries off water after it has passed through the condenser; $f$, pipe for conducting the contents of tank $b$ to tank $g$. This tank is provided with a strainer, at a suitable height above the bottom, which separates the dregs of the wort from the liquid. $k$, pump for raising the liquid from the lower part of tank $g$ to cooler $h$ through pipes $i$ and $i'$. The passages $c''$ descend a little towards pipe $d$, which conducts the condensed vapor to tank $l$. This tank is provided with a condenser, $l'$, similar in construction to the one on tank $b$, with the exception that it has no pipe to conduct away the condensed vapor. The passages descend towards the tank, to which the liquefied vapor may return, or it may be collected in chamber or vessel $m$ under the condenser. $n$ is a pipe which is in connection with the several vapor-passages of the condenser. This pipe provides for the escape of air or non-condensable gases which may be in the apparatus at the commencement of the boiling. $n'$, conducting-pipe for vapor from $l$ to $l'$. $o$, water-pipe, which brings cold water for condenser. $l'$ $o'$, waste-pipe, which takes the water away. This pipe passes downwards from the condenser into the interior of tank $l$, and is then folded upon itself in a vertical serpentine form, and then passes out at the bottom. By this arrangement of water-passage within the tank, and the condenser at its outlet, it becomes a surface-cooler, from which no evaporation can take place. $p$, pipe leading from the cooler $h$ to distributing-pipe $p'$, which, by means of several vertical pipes, is in connection with the working-tuns $q$. $r$, pipe leading from reservoir or cooler $l$ to the distributing-pipes. $p'$ $r'$, several stop-cocks for controlling the liquids.

My process for brewing beer or other malt liquors with the apparatus herein described is as follows: When the wort has been prepared for boiling in a proper manner, the steam is let into pipe $b'$, and the operation begun. As the vapor of the boiling wort rises, it passes into the passages $c''$, which, being surrounded by cold water, condense the vapor to a liquid. This liquefied vapor runs into pipe $d$, and is conducted to tank or cooler $l$, which serves as a reservoir. This liquid contains the aromatic and volatile oils of the malt and hops, and, to prevent their loss by evaporation, I employ another condenser on tank $l$, through which all vapors and non-condensable gases must pass before they reach the open air. This last condenser would better serve its purpose by employing in it a freezing-mixture of ice and salt instead of cold water, but for convenience' sake I use cold water, and afterwards conduct the water through the reservoir to cool its contents. At the commencement of the boiling, the tanks and condensers contain a certain quantity of atmospheric air, which is eventually driven off, but to reach the open air it has to pass through both condensers, which strip it of all the aroma with which it was laden. By these means all the fine aroma of the wort is stored up in the reservoir for future use. After the boiling has ceased, a stream of water should be left running through the reservoir and its condenser to prevent evaporation. The contents of tank $b$ are let down into tank $g$ by opening a large valve in the bottom of the former from tank $g$. After being strained, it is pumped into cooler $h$, which is a large shallow pan occupying the upper portion of the building. Here it is allowed to come in contact with the open air for the purpose of cooling. After it has been reduced to the proper temperature, it is let down to the working-tuns through pipes $p$ and $p'$. In filling the working-tuns, room is left in each of them for their quota of the liquefied vapor in the reservoir, which is afterwards distributed to them. They are now ready to receive the yeast. It has been found by experiment that wort when treated in this way is as fermentable and in every respect as sensitive to the presence of yeast as when its condensed vapor is not mixed with it. During the process of boiling the wort in the ordinary way, about twelve per cent. of the liquid is lost by evaporation; but as no loss whatever occurs in my process, I use in preparing the wort about seven per cent. of water less to a given amount of malt and hops than is used in the old process; and as all the vapor is condensed and returned to the wort, the result is a clear gain of five per cent. in quantity, to say nothing of the improvement in the quality of the liquor.

Malt liquors made by my process are stronger in proportion to their weight than such as are made by the old process; and the delicious aroma of the hop is readily distinguished in the liquor after it has fermented.

It is obvious that if the condensed vapors were returned to the wort before it has been cooled, a large proportion of the volatile oils of the hops would be lost by evaporation while cooling, as the liquors on the cooler are exposed to the atmosphere, whether cooled in the old-fashioned shallow pan in the upper story, or on the new French cooler recently introduced in this country. For that reason, I cool the condensed vapor separately from the wort, in a cooler from which no evaporation can take place, and afterwards mix the two liquids together in the working-tuns. By cooling the wort, by a method similar to the one I adopt for cooling the condensed or liquefied vapor, viz, in a surface-cooler, which is enclosed and provided with a condenser, the volatile oils of the wort would not be lost while cooling. It might, therefore, be practicable, in connection with the use of such a cooler, to condense the vapor of the wort and return the product at once to the boiling-tank. A cooler of this description might easily be made by enclosing the French cooler in an air-tight case, into which the warm wort could be pumped and then conducted to the working-tuns, without, at any time, being exposed to the atmosphere. But, in this case, the steam or vapor of the boiling tank would be kept surcharged with the delicate aroma of the wort, which, in spite of every effort, would escape more or less from the apparatus. It is, therefore, safer and more practical to condense the vapor containing the aroma, and keep the products cool, until it can be mixed with the wort without danger of evaporation.

It might be well to employ a tank for the condensed vapor large enough to contain the whole brewing, and after reducing the vapor of the wort to a liquid, to pass it into this tank through an enclosed surface-cooler, where it should remain till the wort has been sufficiently boiled, when it may also be passed through the enclosed cooler into the tank with the condensed vapor. In this case the two liquids would be more perfectly mixed than they would otherwise be, and neither of them at any time would be exposed to the atmosphere.

Having described my invention, what I desire to have secured to me by Letters Patent, is—

1. The process herein described of brewing malt liquors, viz, condensing the vapor of boiling wort, returning it to the wort in a liquid state, and fermenting the two liquids together, substantially as herein set forth.

2. Cooling the wort and condensed vapor separately, and afterwards mixing the two liquids together before fermentation, substantially as herein specified.

3. Employing a tank or reservoir $l$, with its cooling-device, in combination with tank $b$, with its usual heating-device, substantially as shown and described.

4. The combination with these two tanks of a surface-condenser, $c$, as specified.

WM. H. ELLIOT.

Witnesses:
M. L. ELLIOT,
LOWELL ELLIOT.